US010191553B2

(12) United States Patent
Aurongzeb et al.

(10) Patent No.: US 10,191,553 B2
(45) Date of Patent: Jan. 29, 2019

(54) USER INTERACTION WITH INFORMATION HANDLING SYSTEMS USING PHYSICAL OBJECTS

(71) Applicant: DELL PRODUCTS L.P., Round Rock, TX (US)

(72) Inventors: Deeder M. Aurongzeb, Austin, TX (US); Kenneth Clair Musgrave, Austin, TX (US); Roman Joel Pacheco, Leander, TX (US)

(73) Assignee: Dell Products, L.P., Round Rock, TX (US)

( * ) Notice: Subject to any disclaimer, the term of this patent is extended or adjusted under 35 U.S.C. 154(b) by 576 days.

(21) Appl. No.: 14/656,481

(22) Filed: Mar. 12, 2015

(65) Prior Publication Data
US 2016/0266764 A1    Sep. 15, 2016

(51) Int. Cl.
G06F 3/01        (2006.01)
H04L 29/08       (2006.01)
G06F 3/03        (2006.01)
G06F 3/0346      (2013.01)

(52) U.S. Cl.
CPC ............ *G06F 3/017* (2013.01); *G06F 3/0304* (2013.01); *G06F 3/0346* (2013.01); *H04L 67/22* (2013.01)

(58) Field of Classification Search
CPC ...... G06F 3/017; G06F 3/0346; G06F 3/0304; H04L 67/22
See application file for complete search history.

(56) References Cited

U.S. PATENT DOCUMENTS

| | | | |
|---|---|---|---|
| 8,773,352 B1* | 7/2014 | Huang | G09G 5/00 345/156 |
| 2010/0151946 A1* | 6/2010 | Wilson | G06F 3/017 463/36 |
| 2013/0222427 A1* | 8/2013 | Heo | G06F 3/011 345/633 |
| 2015/0177843 A1* | 6/2015 | Kwon | G06F 3/017 715/863 |
| 2015/0248167 A1* | 9/2015 | Turbell | G06F 3/017 715/754 |
| 2015/0339098 A1* | 11/2015 | Lee | G06F 3/167 715/728 |
| 2016/0189286 A1* | 6/2016 | Zohar | G06K 9/00355 348/150 |
| 2016/0239080 A1* | 8/2016 | Marcolina | G06F 3/011 |

\* cited by examiner

*Primary Examiner* — Kumar Patel
*Assistant Examiner* — Amy C Onyekaba
(74) *Attorney, Agent, or Firm* — Baker Botts L.L.P.

(57) ABSTRACT

Methods and systems for user interaction with information handling systems include using a physical object as a virtual input device. The virtual input device may be manipulated by a user to provide user input to an information handling system. The physical object may be identified and tracked using an image acquisition device. Different types of physical objects may be manipulated by the user to define gestures that are interpreted as user input.

20 Claims, 4 Drawing Sheets

USER INTERACTION WITH INFORMATION HANDLING SYSTEMS USING PHYSICAL OBJECTS

BACKGROUND

Field of the Disclosure

This disclosure relates generally to information handling systems and, more particularly, to user interaction with information handling systems using physical objects.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In certain instances, an information handling system may be limited in user interaction to traditional input devices, such as a mouse or a keyboard.

SUMMARY

In one aspect, a disclosed method for user interaction with an information handling system using physical objects includes acquiring image data associated with an information handling system. The method may include identifying a plurality of physical objects from the image data including a first physical object used by a user. When the first physical object was identified prior to the acquiring of the image data, the method may include updating tracking information for a virtual input device corresponding to the first physical object. The tracking information may be based on a motion of the first physical object. When the virtual input device is an active virtual input device associated with user input to the information handling system, the method may include determining a gesture from the tracking information, the gesture associated with a user input command, and executing the user input command on the information handling system.

Other disclosed aspects include an information handling system and a computer-readable memory media storing processor executable instructions.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), or flash memory (SSD), as well as communications media such wires, optical fibers, microwaves, radio waves, and other electromagnetic or optical carriers, or any combination of the foregoing.

As noted previously, user interaction with an information handling system using traditional input devices, such as a mouse or a keyboard, may not always be available or desirable. There are numerous scenarios in which interaction with an information handling system using gestures may be desirable. Gesture interaction may provide access to features of an information handling system from a distance and may enable operation in certain "no-touch" scenarios, such as medical facilities, industrial environments, and military applications, among others. Gesture interaction may be valuable when traditional input tools are not present or are not suitable, such as in a military vehicle. In many cases gesture interaction with an information handling system may be a more natural way for a user to interact than with traditional input methods, such as when viewing 3-dimensional displays that visualize multimedia content or scenarios.

Nonetheless, it may be advantageous for a user to utilize a physical object during the gesture interaction with the information handling system. Specifically, gesture interaction using the physical object may prevent ambiguities regarding the intent of a gesture, which may improve usability for the user and accuracy of the gesture interaction. For example, the physical object may be used to disambiguate between a gesture that the user intended for the information handling system versus a gesture that was an unintentional body movement. Thus, physical objects may provide clarity, both for the user and the application being controlled, in the gesture interaction, for example, when the gesture interaction begins and ends. However, when predefined input devices are used for the physical objects, it may be disadvantageous for the user to carry and maintain the specific input device, among the many other peripheral devices used with information handling systems.

As will be described in further detail herein, the inventors of the present disclosure have discovered methods and systems for user interaction with information handling systems using physical objects. Users may pair physical objects with an information handling system and use the objects as input devices to interact with the information handling system. The methods and systems for user interaction with information handling systems using physical objects disclosed herein may enable user interaction for more than simple touch events on a given screen area size. The methods and systems for user interaction with information handling systems using physical objects disclosed herein may be based on operating system input systems, which are usable with any application. The methods and systems for user interaction with information handling systems using physical objects disclosed herein may enable desired interaction functionality to be associated with a physical object that the user selects in an ad hoc manner.

Particular embodiments are best understood by reference to FIGS. 1, 2, 3, and 4 wherein like numbers are used to indicate like and corresponding parts.

Figure 1:
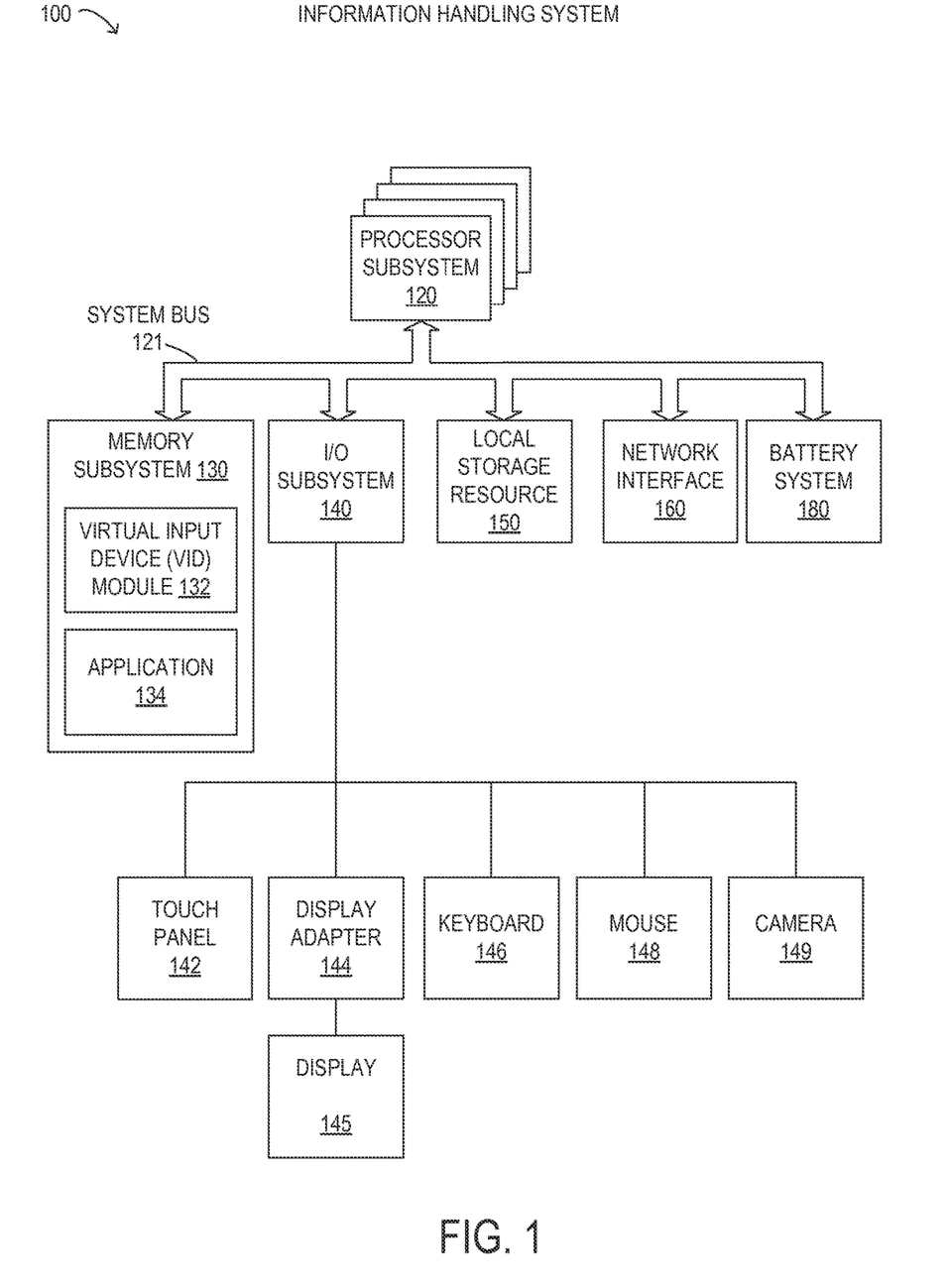
FIG. 1 is a block diagram of selected elements of an embodiment of an information handling system.

Turning now to the drawings, FIG. 1 illustrates a block diagram depicting selected elements of an embodiment of information handling system 100. In various embodiments, information handling system 100 may represent different types of devices, including portable devices.

As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard, including, but not limited to, various network transmission protocols and standards. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or other digital or analog circuitry configured to interpret and execute program instructions and process data. In some embodiments, processor subsystem 120 may interpret and execute program instructions and process data stored locally (e.g., in memory subsystem 130). In the same or alternative embodiments, processor subsystem 120 may interpret and execute program instructions and process data stored remotely (e.g., in a network storage resource).

Also in FIG. 1, memory subsystem 130 may comprise a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCM-CIA card, flash memory, magnetic storage, opto-magnetic storage, or a suitable selection or array of volatile or non-volatile memory that retains data after power is removed. Local storage resource 150 may comprise computer-readable media (e.g., hard disk drive, floppy disk drive, CD-ROM, or other type of rotating storage media, flash memory, EEPROM, or another type of solid state storage media) and may be generally operable to store instructions and data. As shown, memory subsystem 130 stores virtual input device (VID) module 132 for user interaction with information handling systems using physical objects, as will be described in further detail. Memory subsystem 130 also stores application 134, which may represent any application executable on information handling system 100 and may be enabled for user interaction with information handling systems using physical objects, in conjunction with VID module 132.

In information handling system 100, I/O subsystem 140 may comprise a system, device, or apparatus generally operable to receive or transmit data to or from or within system 100. I/O subsystem 140 may represent, for example, any of a variety of communication interfaces, graphics interfaces, video interfaces, user input interfaces, and peripheral interfaces. As shown, I/O subsystem 140 may comprise touch panel 142, display adapter 144, keyboard 146, mouse 148, and camera 149. Touch panel 142 may include circuitry for enabling touch functionality in conjunction with display 145 that is driven by display adapter 144. Mouse 148 and keyboard 146 may represent physical input devices. Camera 149 may include one or more image acquisition devices that provide image data for recognition and tracking of physical objects intended for user interaction with information handling system 100, as disclosed herein. In various embodiments, camera 149 may recognize and track any of a plurality of physical objects intended for user interaction. In various embodiments, camera 149 may support 2-dimensional (2D) and 3-dimensional (3D) image acquisition.

In operation, information handling system 100 may be enabled for user interaction using physical objects, as disclosed herein. Specifically, information handling system 100 may pair with arbitrarily selected physical objects for use as input devices. Camera 149 along with corresponding instructions (or code) may implement object recognition to identify and classify the physical objects used as input devices and determine input actions that the physical objects can be used to perform. For example, imagery generated using camera 149 may monitor a user environment and recognize the actions of the hands of a user, and may accordingly recognize when the user is using the physical object when the physical object appears in the field of view of camera 149. In some embodiments, use of the physical object by the user may be ascertained by physical contact between the physical object and the user. The physical contact may be continuous or intermittent. For such purposes, information handling system 100 may implement certain computer vision methods, such as object segmentation, feature extraction, object recognition, object tracking, among others. Then, information handling system 100 may classify the object into one of several categories of so-called "virtual input devices" or "VID" that a physical object may be used to represent (or emulate) for user interaction. Certain object tracking methods may be used to monitor and detect gestures that the user performs with the physical object to determine user input functionality of the virtual input device.

In given embodiments, exemplary virtual input device categories and corresponding functionality are described in Table 1. It is noted that Table 1 describes a non-limiting set of virtual input device categories, and that various other types and categories of virtual input devices are contemplated herein.

TABLE 1

Exemplary virtual input device (VID) categories

| Virtual Input Device Category | Physical Object Types | Functionality |
| --- | --- | --- |
| Pointer | pens, rods, wands, pointers, elongated objects, user-worn objects | translate object motions into commands that move an on-screen cursor or indicator, detect click-event gestures, |
| Orientation | six-sided objects (blocks), pens, rods, wands, elongated objects, orbs/spheres with trackable features | translate object movements into rotation, translation, and scale commands to manipulate 3D scenes |
| Stylus | pens, rods, wands, pointers, elongated objects, objects with a defined tip | translate object motions and gestures into writing events and in-air annotations |
| Dial | rounded caps, coins, circular or cylindrical objects | translate rotations into rotary input (increase/decrease) for a particular parameter, such as volume, zoom level, scroll position |
| Mode | multi-sided objects (blocks, pyramids, polyhedrons), orbs/spheres with trackable features | translate the positioning of the object into mode selection, such as input modes, operational modes, tab selection, control a view in a 3D application |

Certain virtual input device categories may be supported by operating system functionality, such as a pointer and a stylus, for example. Some virtual input devices may be application-specific. Accordingly, user input received using a virtual input device may be directly translated into a given input command. However, user input associated with a virtual input device may be customized for specialized inputs in a given context or for a given application.

Figure 2:
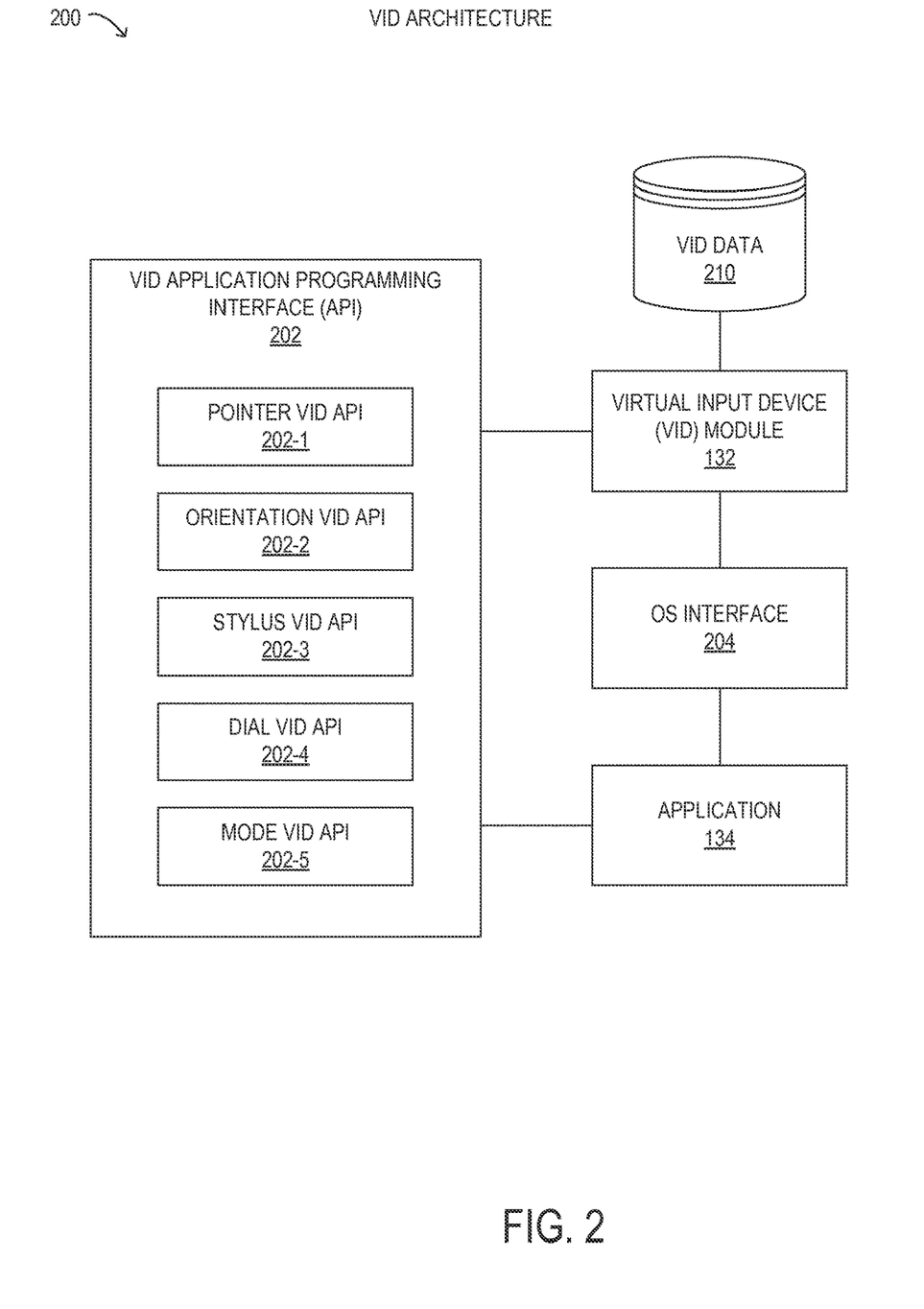
FIG. 2 is a block diagram of selected elements of an embodiment of a virtual input device architecture.

Referring now to FIG. 2, selected elements of an embodiment of VID architecture 200 are illustrated. As shown, VID architecture 300 represents functionality for user interaction with information handling systems using physical objects, as disclosed herein, such as with information handling system 100 in FIG. 1. As shown in FIG. 2, VID architecture 300 includes VID module 132 and application 134, as shown in FIG. 1. VID architecture 300 is also shown including VID data 210, operating system (OS) interface 204, as well as VID application programming interface (API) 202. OS interface 204 may enable VID module 132 to access various resources from an operating system, such as input devices, notifications, display objects, among others. It is noted that, in different embodiments, VID architecture 300 may be implemented with additional or fewer elements than depicted in FIG. 2.

In VID architecture 300, VID module 132 may perform detection and recognition of physical objects from image data, such as acquired using camera 149. In particular embodiments when camera 149 supports video imaging, VID module 132 may operate on individual image frames in a sequence of video image data. Furthermore, VID module 132 may perform tracking of the physical objects, once detected and identified. The tracking of the physical objects may include detecting a motion or orientation of a physical object that is being manipulated by a user for the purposes of user input to the information handling system. Based on the detected motion or orientation of the physical object, gesture recognition using the physical object may be performed by VID module 132.

In addition, VID module 132 may identify the physical object as a known VID, for which VID module 132 may store information using VID data 210. For example, VID data 210 may include a database of VIDs that VID module 132 has identified. VID module 132 may further be enabled to add new VIDs and remove unused or undesired VIDs. The information that VID module 132 may collect with regard to VIDs may include a VID's category (see Table 1), functionality, trigger events, and activation status. The functionality and trigger events may describe certain gestures and associated user input commands for a VID. The activation status of a VID may determine whether the VID is currently being used for user input. VID data 210 may further be used to store tracking information for VIDs (see also FIG. 4). In various embodiments, VID module 132 may be enabled to receive other kinds of user input (not from image data, such as voice) to control, define, modify, and otherwise manage VIDs, such as via conventional user input devices used with information handling system 100. VID module 132 may also be enabled to issue user notifications for events and actions associated with VIDs, such as confirming creation of a new VID based on an identified physical object, activation of a VID, and responses to recognizing gestures and associated user input commands, such as via audio feedback, as a non-limiting example.

In operation of VID architecture 300, VID module 132 may utilize different methods to execute user input commands associated with application 134, which may represent any application executing on information handling system 100. In one method, VID module 132 may send notifications to OS interface 204 when a user input command supported by an operating system executing on information handling system 100 is received. In this manner, user input commands received from gestures performed by the user by manipulating a VID may be translated into conventional user input commands that are also available using conventional user input devices, such as a mouse and a keyboard. For specialized (or customized) functionality, VID module 132 may use VID API 202 to execute certain user input commands that have been specifically implemented for use with VIDs and that may not be implemented in the operating system. The user input commands supported by VID API 202 may be exclusively available to a software application that implements, or includes, at least a portion of VID API 202. As shown, VID API 202 includes APIs for VID categories described above with respect to Table 1, namely pointer VID API 202-1, orientation VID API 202-2, stylus VID API 202-3, dial VID API 202-4, and mode VID API 202-5. It is noted that VID API 202 may be modified to include fewer or additional VID APIs, as desired.

Figure 3:
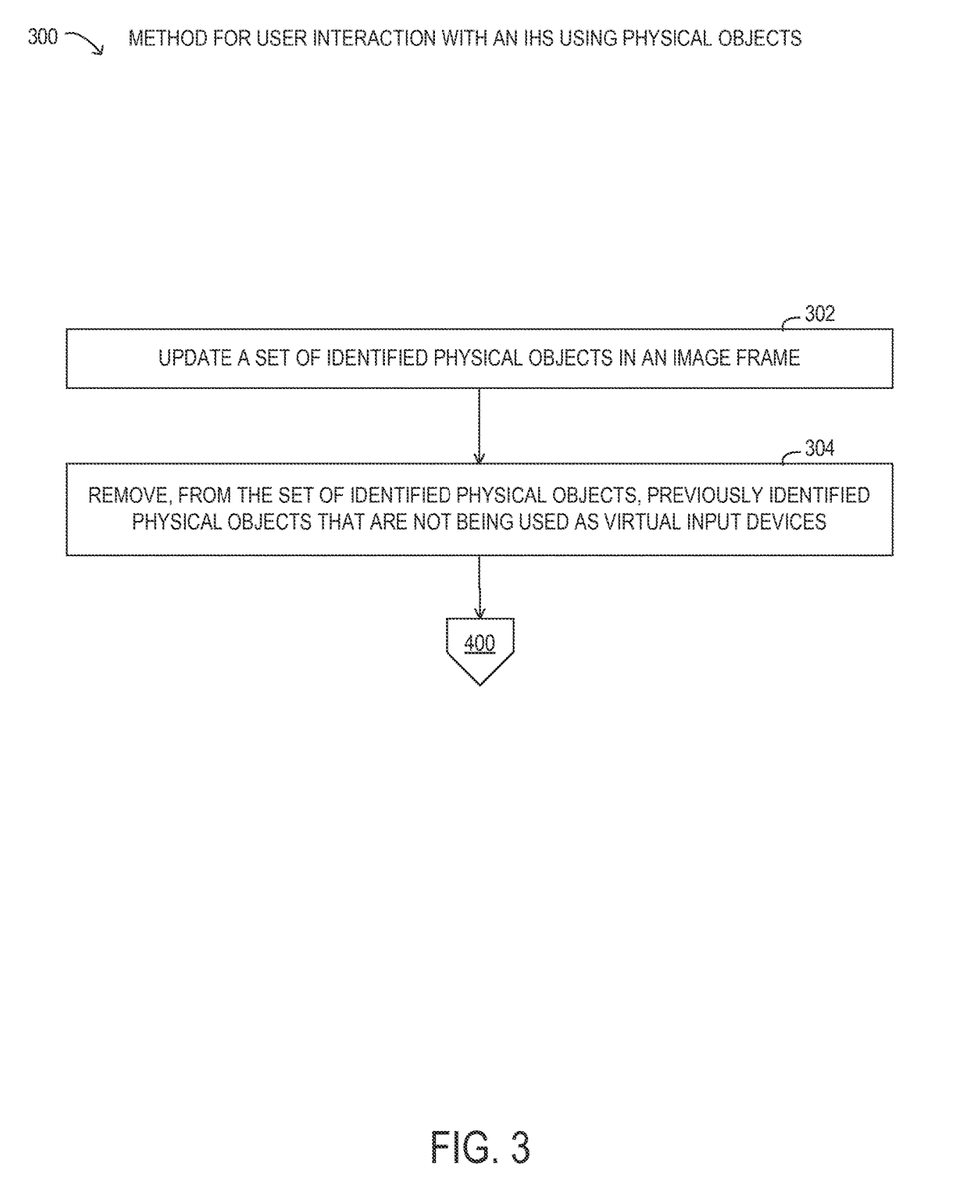
FIG. 3 is flowchart depicting selected elements of an embodiment of a method for user interaction with an information handling system using physical objects.

Referring now to FIG. 3, a flow chart of selected elements of an embodiment of method 300 for user interaction with an information handling system using physical objects, as described herein, is depicted. Method 300 may be performed using VID module 132 (see FIGS. 1 and 2). In particular, method 300 may be performed each time image data are acquired, such as for each image frame acquired during video imaging. It is noted that certain operations described in method 300 may be optional or may be rearranged in different embodiments.

Method 300 may begin by updating (operation 302) a set of identified physical objects in an image frame. The identified physical objects may be VIDs, as described above, that are recognized in operation 302. The identified physical objects may be new physical objects that are not yet registered as VIDs. The set of identified physical objects may be recorded and updated in an ongoing manner. Previously identified physical objects that are not being used as VIDs may be removed (operation 304) from the set of identified physical objects. In certain embodiments, removal of a physical object in operation 304 may occur when the physical object does not appear in the image frame. After operation 304, method 300 may proceed to method 400 described below in FIG. 4.

Figure 4:
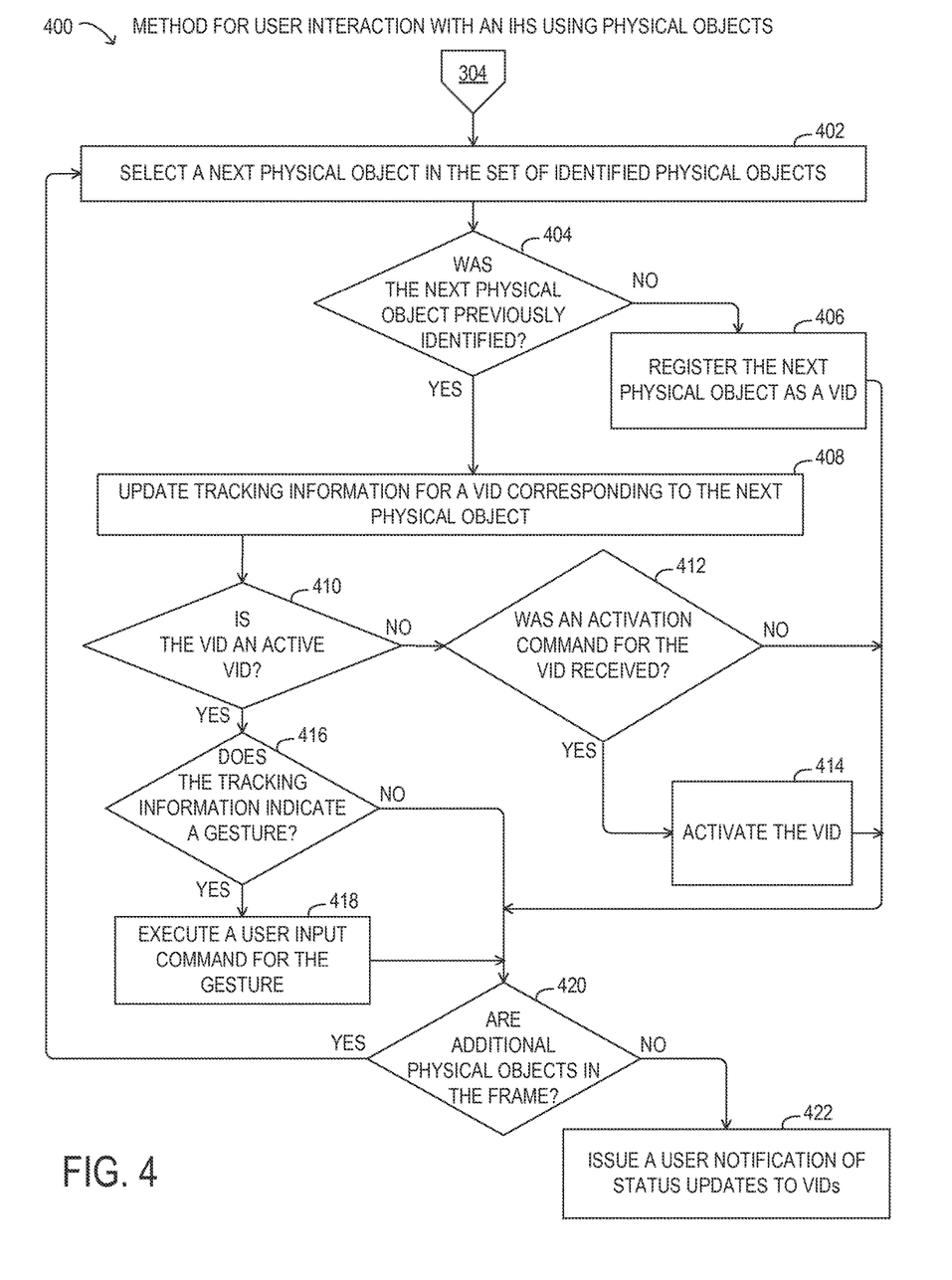
FIG. 4 is flowchart depicting selected elements of an embodiment of a method for user interaction with an information handling system using physical objects.

Referring now to FIG. 4, a flow chart of selected elements of an embodiment of method 400 for user interaction with an information handling system using physical objects, as described herein, is depicted. Method 400 may be performed using VID module 132 (see FIGS. 1 and 2). In particular, method 400 may be performed for each physical object detected in method 300, for example, subsequent to operation 304 (see FIG. 3). The term "next" is used in method 400 to refer to a currently selected element in an iteration, and does not explicitly or implicitly refer to an ordering of elements. It is noted that certain operations described in method 400 may be optional or may be rearranged in different embodiments.

Method 400 may begin by selecting (operation 402) a next physical object in the set of identified physical objects. Then a decision is made whether the next physical object was previously identified (operation 404). When the result of operation 404 is NO, method 400 may proceed to register (operation 406) the next physical object as a VID. After operation 406, method 400 may jump to operation 420. When the result of operation 404 is YES, tracking information for a VID corresponding to the next physical object may be updated (operation 408). The tracking information may represent image data for the next physical object. Then, method 400 may make a decision whether the VID is (operation 410) an active VID? An active VID may be defined as a VID (an identified physical object) that is currently being used for user input. When the result of operation 410 is NO, method 400 may proceed to operation 412. When the result of operation 410 is YES, method 400 may proceed to operation 416.

When the result of operation 410 is NO, a decision may be made whether an activation command for the VID was received (operation 412). The activation command may be received from another VID or from previous image data. The activation command may be received from another source than the image data, such as a voice activation command or a conventional user input to the information handling system. Activation of a VID may include viewing visual feedback showing real-time identification and tracking of the physical object, including feedback confirming that specific gestures are identified as specific user input commands. In certain embodiments, a prompt may be issued to the user in operation 412 to activate the VID (or not activate the VID). When the result of operation 412 is NO, method 400 may jump to operation 420. When the result of operation 412 is YES, method 400 may activate (operation 414) the VID, and then jump to operation 420.

When the result of operation 410 is YES, a decision may be made whether the tracking information indicates (operation 416) a gesture. When the result of operation 416 is NO, method 400 may proceed to operation 420. When the result of operation 416 is YES, a user input command for the gesture may be executed (operation 418). Then, a decision may be made whether additional physical objects are (operation 420) in the frame. When the result of operation 420 is YES, method 400 may loop back to operation 402, where another next physical object is selected. When the result of operation 420 is NO, a user notification of status updates to VIDs may be issued (operation 422). Operation 422 may include outputting a visual, acoustic, or other type of indication to the user.

As disclosed herein, methods and systems for user interaction with information handling systems include using a physical object as a virtual input device. The virtual input device may be manipulated by a user to provide user input to an information handling system. The physical object may be identified and tracked using an image acquisition device. Different types of physical objects may be manipulated by the user to define gestures that are interpreted as user input.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for user interaction with information handling systems, the method comprising:
   acquiring image data associated with an information handling system;
   identifying a plurality of physical objects from the image data including a first physical object used by a user;
   identifying that the first physical object corresponds to a virtual input device from a set of virtual input devices accessible to the information handling system;
   identifying a virtual input device category of the virtual input device from a set of virtual input device categories of the set of virtual input devices;
   updating tracking information for the virtual input device corresponding to the first physical object, wherein the tracking information is based on a motion of the first physical object;
   assigning the virtual input device as an active virtual input device associated with user input to the information handling system;
   determining a gesture from a motion of the virtual input device performed by the user corresponding to the tracking information based on the virtual input device category;
   identifying a user input command associated with the virtual input device based on the gesture from a set of user input commands accessible to the information handling system and the virtual input device category; and
   executing the user input command on the information handling system based on the virtual input device category, wherein the set of virtual input device categories comprise a pointer category, a stylus category, and a dial category.

2. The method of claim 1, wherein acquiring the image data includes:
   acquiring image frames from a video capture device coupled to the information handling system.

3. The method of claim 1, further comprising:
   when the first physical object was not identified prior to the acquiring of the image data, registering the first physical object as the virtual input device.

4. The method of claim 1, further comprising:
   when the virtual input device is not an active virtual input device associated with user input to the information handling system, determining whether an activation command for the virtual input device was received; and
   when the activation command was received, activating the virtual input device for the user input.

5. The method of claim 1, wherein identifying the user input command is further based on a given context of the information handling system.

6. The method of claim 1, wherein identifying the user input command is further based on a given application of the information handling system.

7. The method of claim 1, further comprising:
   issuing a user notification indicating status updates associated with the virtual input device.

8. An information handling system, comprising:
   a processor;
   a memory communicatively coupled to the processor; and
   a virtual input device module stored in the memory and including computer readable instructions that, when executed, cause the processor to:
   acquire image data associated with an information handling system;
   identify a plurality of physical objects from the image data including a first physical object used by a user;
   identify that the first physical object corresponds to a virtual input device from a set of virtual input devices accessible to the information handling system;
   identify a virtual input device category of the virtual input device from a set of virtual input device categories of the set of virtual input devices;
   update tracking information for the virtual input device corresponding to the first physical object, wherein the tracking information is based on a motion of the first physical object;
   assign the virtual input device as an active virtual input device associated with user input to the information handling system;
   determine a gesture from a motion of the virtual input device performed by the user corresponding to the tracking information based on the virtual input device category;
   identify a user input command associated with the virtual input device based on the gesture from a set of user input commands accessible to the information handling system and the virtual input device category; and
   execute the user input command on the information handling system based on the virtual input device category, wherein the set of virtual input device categories comprise a pointer category, a stylus category, and a dial category.

9. The information handling system of claim 8, wherein the instructions to execute the user input command include instructions to:
   send the user input command to an application executing on the information handling system.

10. The information handling system of claim 8, further comprising instructions to:
    when the first physical object was not identified prior to the acquiring of the image data, register the first physical object as the virtual input device.

11. The information handling system of claim 8, further comprising instructions to:
    when the virtual input device is not an active virtual input device associated with user input to the information handling system, determining whether an activation command for the virtual input device was received; and
    when the activation command was received, activating the virtual input device for the user input.

12. The information handling system of claim 11, wherein identify the user input command is further based on a given context of the information handling system.

13. The information handling system of claim 11, wherein identify the user input command is further based on a given application of the information handling system.

14. The information handling system of claim 8, further comprising instructions to:

issue a user notification indicating status updates associated with the virtual input device.

15. At least one non-transitory computer readable medium, comprising computer readable instructions for user interaction with information handling systems, the instructions, when executed, cause a processor to:

acquire image data associated with an information handling system;

identify a plurality of physical objects from the image data including a first physical object used by a user;

identify that the first physical object corresponds to a virtual input device from a set of virtual input devices accessible to the information handling system;

identify a virtual input device category of the virtual input device from a set of virtual input device categories of the set of virtual input devices;

update tracking information for the virtual input device corresponding to the first physical object, wherein the tracking information is based on a motion of the first physical object;

assign the virtual input device as an active virtual input device associated with user input to the information handling system;

determine a gesture from a motion of the virtual input device performed by the user corresponding to the tracking information based on the virtual input device category;

identify a user input command associated with the virtual input device based on the gesture from a set of user input commands accessible to the information handling system and the virtual input device category;

execute the user input command on the information handling system based on the virtual input device category, wherein the set of virtual input device categories comprise a pointer category, a stylus category, and a dial category; and issue a user notification indicating status updates associated with the virtual input device.

16. The computer readable medium of claim 15, wherein the instructions to execute the user input command include instructions to:

send the user input command to an application executing on the information handling system.

17. The computer readable medium of claim 15, further comprising instructions to:

when the first physical object was not identified prior to the acquiring of the image data, register the first physical object as the virtual input device.

18. The computer readable medium of claim 15, further comprising instructions to:

when the virtual input device is not an active virtual input device associated with user input to the information handling system, determining whether an activation command for the virtual input device was received; and when the activation command was received, activating the virtual input device for the user input.

19. The computer readable medium of claim 18, wherein identify the user input command is further based on a given context of the information handling system.

20. The computer readable medium of claim 18, wherein identify the user input command is further based on a given application of the information handling system.

* * * * *